United States Patent [19]
Yamamoto et al.

[11] Patent Number: 5,619,305
[45] Date of Patent: Apr. 8, 1997

[54] NEGATIVE FILM MASKING APPARATUS FOR PHOTOGRAPHIC PRINTER

[75] Inventors: Akihito Yamamoto; Mitsuhiko Itojima, both of Wakayama, Japan

[73] Assignee: Noritsu Koki Co., Ltd., Wakayama, Japan

[21] Appl. No.: 324,661

[22] Filed: Oct. 18, 1994

[30] Foreign Application Priority Data

Oct. 19, 1993 [JP] Japan .................................. 5-261140
Oct. 22, 1993 [JP] Japan .................................. 5-264888

[51] Int. Cl.⁶ ........................................................ G03B 27/58
[52] U.S. Cl. ........................................................... 355/75
[58] Field of Search ................................. 355/76, 125, 75

[56] References Cited

U.S. PATENT DOCUMENTS

| | | | |
|---|---|---|---|
| 4,194,836 | 3/1980 | Rapp et al. | 355/75 |
| 4,240,744 | 12/1980 | Rapp et al. | 355/74 |
| 4,396,281 | 8/1983 | Okabe et al. | 355/75 |
| 4,450,536 | 5/1984 | Schroeder | 355/75 |
| 5,343,273 | 8/1994 | Yamamoto et al. | 355/75 |

FOREIGN PATENT DOCUMENTS 57-006835  1/1982  Japan .

*Primary Examiner*—Arthur T. Grimley
*Assistant Examiner*—David A. Lane
*Attorney, Agent, or Firm*—Wenderoth, Lind & Ponack

[57] ABSTRACT

A negative film masking apparatus for use in a photographic printer comprises positioning pins arranged for projecting from the upper surface of the masking base to locate the negative film masking at a given position, detector switches provided for projecting from the upper surface of the masking base to detect the type of the negative film masking, and a lifting means for driving the positioning pins and the detector switches to project from the upper surface of the masking base.

17 Claims, 7 Drawing Sheets

NEGATIVE FILM MASKING APPARATUS FOR PHOTOGRAPHIC PRINTER

BACKGROUND OF THE INVENTION

The present invention relates to a negative film masking apparatus provided with a trimming negative film masking for use in a photographic printer.

Photographic negative films are classified into a number of sizes (including 135F, 6×4.5, 6×6, 6×7, and 6×9).

For trimming and printing a portion of the frame of such a negative film, a negative film masking having a masking window of the same size as of the film frame has to be used in the prior art. It is thus needed for an operator of the photographic printer to remember the window size of the negative film masking to be used and input its data to or select a corresponding channel of the printer. However, the negative film masking when having been installed to a masking base in the photographic printer can hardly be examined for its window size and may be mishandled as a different size producing a fault print.

Such a conventional negative film masking apparatus of the photographic printer has a magnet-equipped masking base on which a magnetic plate carrying the negative film masking is placed and secured by a magnetic force.

The positional adjustment of the negative film masking is however limited due to unfavorable dimensional relation between the magnet and the magnetic plate, thus restricting the trimming action.

The magnetic force of the magnet is small enough to allow the negative film masking to move for adjustment. Accordingly, the masking tends to slip out from the masking base which is commonly arranged tilting due to a structural orientation in the photographic printer.

It is an object of the present invention, in view of the foregoing aspects, to provide an improved negative film masking apparatus for a photographic printer where a detector switch is disposed to protrude from the base surface of a masking base so that the type of a negative film masking loaded on the base surface can be examined for matching the type of a negative film, but not to disturb the trimming action.

It is another object of the present invention to provide a negative film masking apparatus for a photographic printer capable of securing a negative film masking tightly to the masking base for prevention of slipping-off.

SUMMARY OF THE INVENTION

As defined in claim 1 of this specification, a negative film masking apparatus for use in a photographic printer according to the present invention comprises a plurality of negative film masking for trimming, each having a masking window of a discrete size which corresponds to the type of a negative film to be printed, and a masking base on which the negative film masking is placed. In particular, the negative film masking apparatus is characterized by positioning pins arranged for projecting from the upper surface of the masking base to locate the negative film masking at a given position, detector switches provided for projecting from the upper surface of the masking base to detect the type of the negative film masking, and a lifting means for driving the positioning pins and the detector switches to project from the upper surface of the masking base.

As defined in claim 2, a negative film masking apparatus for a photographic printer according to claim 1 further comprises detecting pattern regions provided on the lower side of the negative film masking, each being designed for representing the size of the masking window and consisting of recesses and a land. The detector switches when being lifted to project from the upper surface of the masking base come to be either pressed against the land and accepted in the recesses, thus producing a combination of switching on/off actions. The switching action is translated to a detection signal indicative of the type of the negative film masking which is then fed to a display means for display of the type.

As defined in claim 3, a negative film masking apparatus for a photographic printer having a negative film masking with a masking window placed on a masking base with a square opening for movement to perform a trimming action, is characterized by magnetic plates mounted about the masking window on the lower surface of the negative film masking, guide regions made of a non-magnetic material and arranged on the masking base, and magnets arranged movable along the guide regions and attracting the magnetic plates.

As defined in claim 4, a negative film masking apparatus for a photographic printer according to claim 3 is characterized in that any undesired displacement of the negative film masking on the masking base is prevented by an anti-slip mechanism.

In the negative film masking apparatus for a photographic printer defined in claim 1, the type of the negative film masking can successfully be identified by the action of the detector switches when it has been placed on the masking base.

After identification of the negative film masking type, the detector switches are retracted to clear the masking base.

As the result, the negative film masking can freely be moved on the upper surface of the masking base for conducting a trimming action.

The negative film masking apparatus for a photographic printer defined in claim 1 allows the type of the negative film masking to be examined by projecting the detector switched from the upper surface of the masking base and also, the trimming action to be carried out without interruption of the detector switches.

Furthermore, since the positioning pins hold and allow no displacement of the negative film masking from its correct position, any fault detecting action of the detector switch will be avoided. The positioning pins after completion of the detecting action are retracted from the upper surface of the masking base thus to permit the trimming action of the negative film masking.

The negative film masking apparatus for a photographic printer defined in claim 2 allows the detector switches to when projecting, be either pressed against the land and accepted in the recesses, thus producing a combination of switching on/off actions.

As the layout of the land and recesses corresponds to the size of the masking window of the negative film masking, the combination action of the detector switches produces a detection signal indicative of the window size. In response to the detection signal, the display means can display the type of the negative film masking.

The negative film masking apparatus for a photographic printer defined in claim 3 allows the negative film masking to be closely placed on the masking base with its magnetic plates attracted by the magnets of the masking base.

When the negative film masking is moved on the masking base to perform a trimming action, the magnets attracting the magnetic plates can travel along the guide regions.

Accordingly, the negative film masking is movable within an extensive area defined by the movement of the magnets (or the extension of the guide regions)

The negative film masking apparatus for a photographic printer defined in claim 4 allows the negative film masking to be securely held on the masking base with the anti-slip mechanism as well as the attraction of the magnetic plates in the negative film masking by the magnets in the masking base.

DETAILED DESCRIPTION OF THE PREFERRED EMBODIMENTS

Embodiment 1

Figure 1:
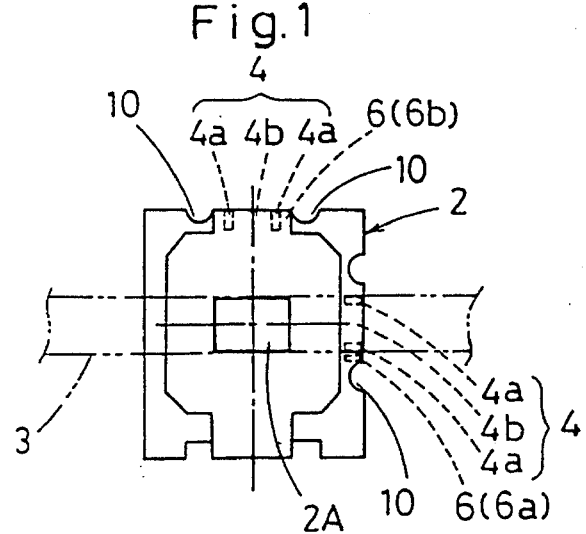
FIG. 1 is a plan view of a negative film masking in a negative film masking apparatus for a photographic printer according to a first embodiment of the present invention.
Figure 2:
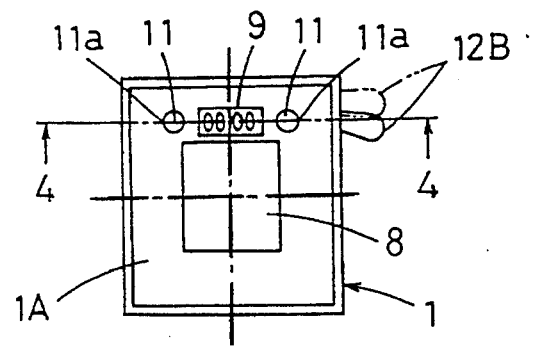
FIG. 2 is a plan view of a masking base in the first embodiment.
Figure 3:
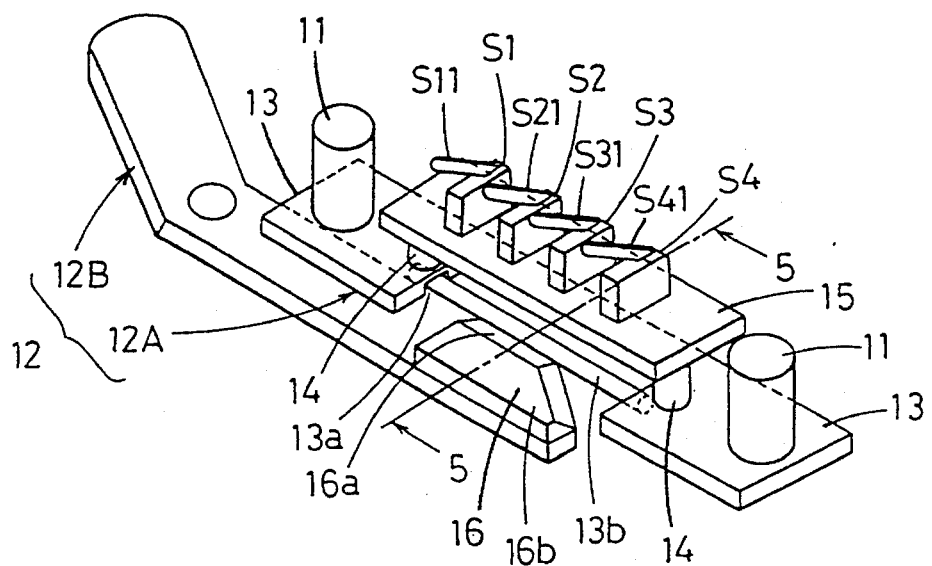
FIG. 3 is a perspective view of a lifting means for lifting detector switches in the first embodiment.

A negative film masking apparatus comprises a masking base 1 and a negative film masking 2 mounted slidably on the base surface 1A of the masking base 1.

There are provided an exposure apparatus (not shown) beneath the negative film masking apparatus and a light source (not shown) above the same. Also, an apparatus for aligning the center of a trimmed image with the optical axis is provided but not illustrated.

The negative film masking apparatus is provided with a several number of trimming negative film maskings 2. Each of the negative film maskings 2 has at center a masking window 2A of which size corresponds to the size of a negative film 3 (e.g. 135F, 6×4.5, 6×6, 6×7, or 6×9). The negative film masking 2 has a detecting pattern region 4 on the back side thereof.

Figure 6:
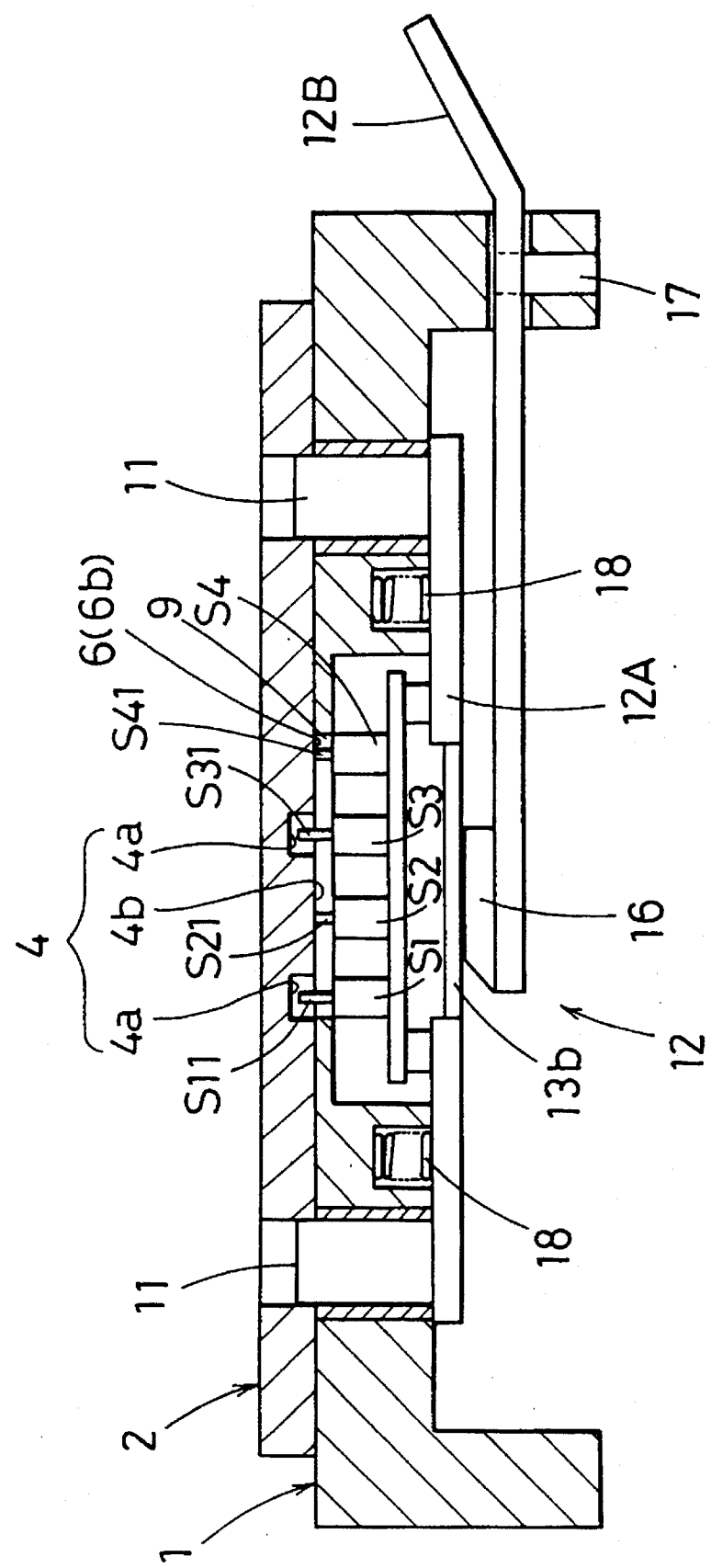
FIG. 6 is a cross sectional view showing an action of the lifting means with detecting pins in the negative film masking apparatus of the first embodiment.

The detecting pattern region 4 allows three detector switches (limitswitches) S1, S2, and S3, which will be described later in more details, to detect the type of the negative film masking 2 and comprises recesses 4a and a land 4b arranged abreast, as shown in FIGS. 1 and 6. The layout of the recesses 4a and land 4b is specific for representing the size of the window 2A of the negative film masking 2. In this embodiment, the land 4b of the detecting region 4 is disposed between the two recesses 4a.

Also, a direction detecting pattern region 6 is provided to allow a direction detector switch (limitswitch) S4, which will be described later in more detail, to detect the direction of the negative film masking 2. The direction detecting pattern region 6 like the detecting pattern region 4 comprises recesses and a land.

The negative film masking 2 has a pair of engaging (semicircular) notches 10 provided in one side thereof for accepting two positioning pins 11, which will be explained later, to locate the negative film masking 2 at a given position on the masking base 1.

The masking base 1 has an opening 8 therein for passing a beam of light for printing and a switch slot 9 arranged therein to face the direction detecting pattern region 6 of the negative film masking 2. Also, the masking base 1 has two pin holes 11a arranged therein to associate with the engaging notches 10 of the negative film masking 2. Each the pin hole 11a has a bushing 11b accommodated therein. There are two spring pits 19 provided in the masking base 1 between the switch slot 9 and the two pin holes 11a.

For convenience of use, two sets of the detecting pattern region 4, the direction detecting pattern region 6, and the engaging notches. 10 are provided on two adjacent sides of the negative film masking 2 respectively.

The detector switch S1, S2, S3, and S4 and the positioning pins 11 are actuated by a lifting means 12 for projecting upward through the switch slot 9 and the pin holes 11a.

The lifting means 12 comprises a lift 12A and a lifting lever 12B.

As shown in FIGS. 3 to 6, the lift 12A comprises a switch support 15 mounted on two support 14 to extend between a couple of blocks 13. Each the block 13 has a fitting recess 13a arranged in the inner edge of the back side thereof. A cross bar 13b is rotatably fitted at both ends into the fitting recesses 13a of the blocks 13.

The switch support 15 of the lift 12A carries the four detector switches S1, S2, S3, and S4; the former three for detecting the type of the negative film masking 2 and the latter one for detecting the direction of the same.

The two positioning pins 11 are vertically disposed on the blocks 13 of the lift 12A respectively.

The lifting lever 12B has a projection 16 mounted on the distal end of the upper side thereof. The projection 16 has a guide slope 16a arranged at one edge thereof. The lifting lever 12B is pivotably mounted at center to the masking base 1 by a vertical pin 17.

Two compression springs 18 are accommodated in the spring pits 19 of the masking base 1 respectively with their lower ends projecting and urging their respective blocks 13 of the lift 12A downwardly so that the cross bar 13b of the lift 12A remains in elastic contact with the guide slope 16a of the projection 16 of the lifting lever 12B.

In action, when the lifting lever 12B is turned as shown in FIG. 6, its guide slope 16a lifts up the cross bar 13b which in turn travels from the guide slope 16a to the upper surface 16b of the projection 16. As the result, the lift 12A is pressed up against the yielding force of the compression springs 18 causing the positioning pins 11 and the detector switches S1, S2, S3, and S4 with their movable probes S11, S21, S31, and S41 to project through the pin holes 11a and the switch slot 9.

Figure 8:
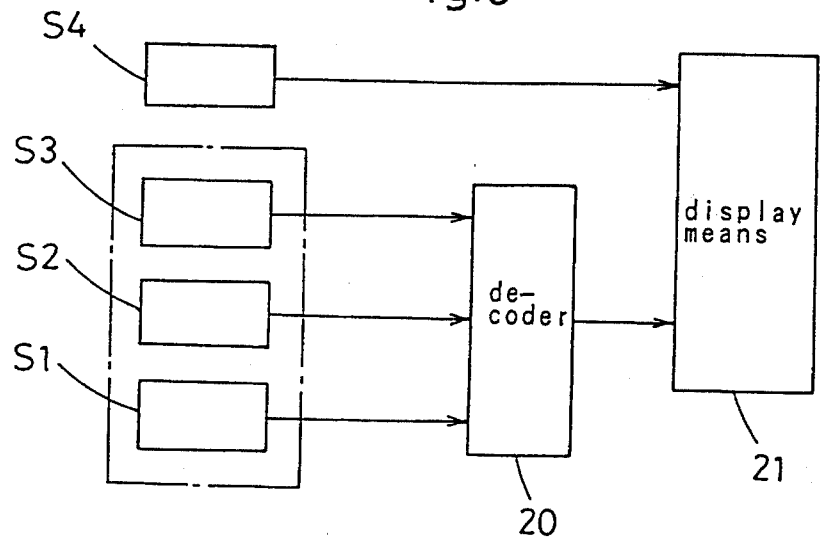
FIG. 8 is a block diagram showing a process of detecting and displaying the direction and type of the negative film masking in the first embodiment.

FIG. 8 is a block diagram showing a process of detecting the type and direction of the negative film masking 2.

In the process, the detector switches S1, S2, and S3 produces detection signals which are then fed to a decoder 20. A display means 21 when receiving a signal from the decoder 20 displays the type of the negative film masking 2.

The display means 21 also displays the direction of the negative film masking 2 when receiving a detection signal from the direction detector switch S4.

The negative film masking apparatus for a photographic printer having the foregoing arrangement preforms a sequence of steps as explained below to examine whether the negative film masking 2 is prepared of the type corresponding to the size of a negative film 3 loaded, while the detector switches S1 to S4 being maintained not to interrupt the trimming action.

Figure 4:
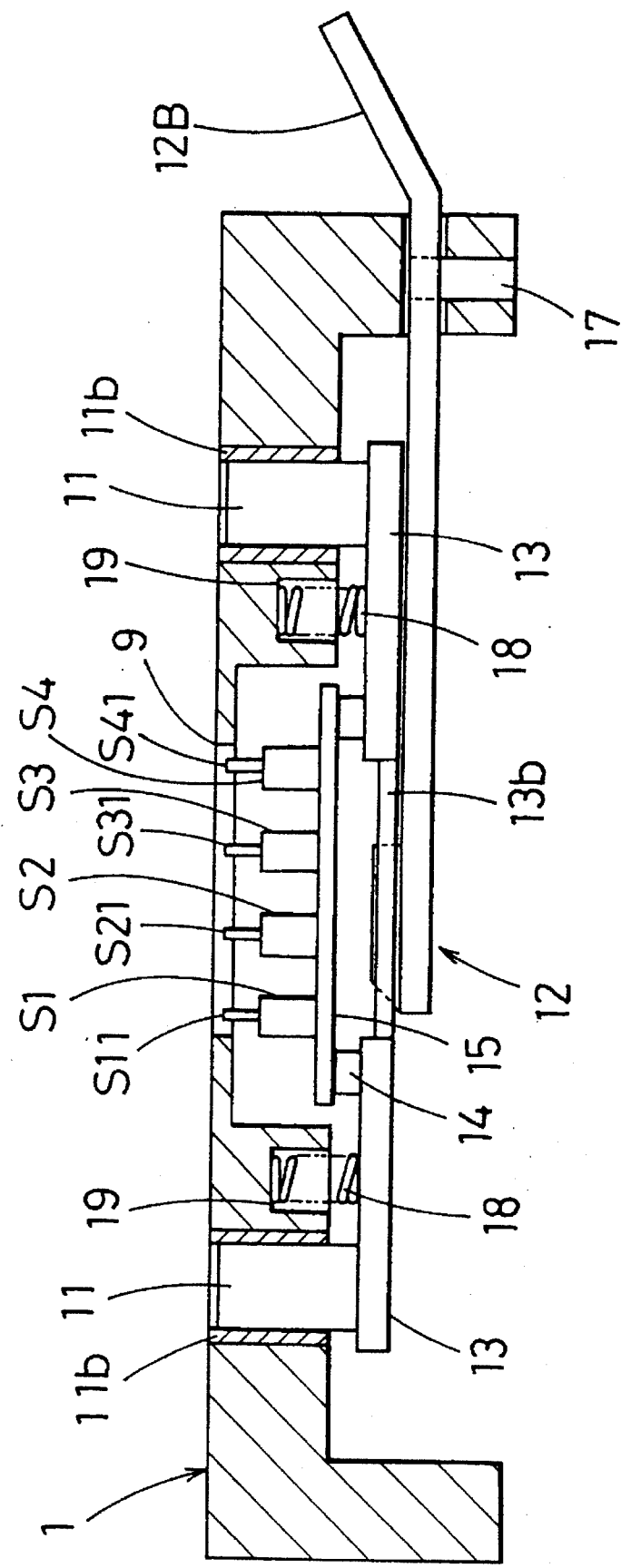
FIG. 4 is a cross sectional view taken along the line A—A of FIG. 2.
Figure 5:
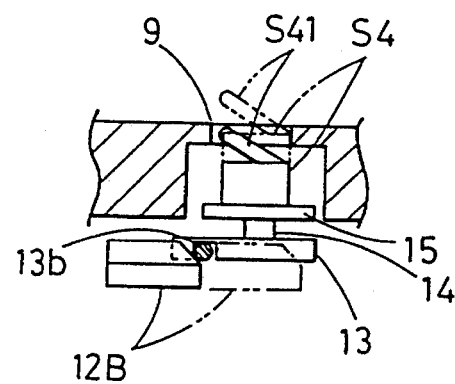
FIG. 5 is a cross sectional view taken along the line B—B of FIG. 3.

(1) At beginning, the type detector switches S1 to S4 and the positioning pins 11 remain lowered and retracted from the base surface 1A as shown in FIG. 4. The negative film masking 2 is placed over the base surface 1A of the masking base 1.

(2) Then, by actuating the lifting lever 12B, the probes S11, S21, and S31 of their respective detector switches S1, S2, and S3 as well as the positioning pins 11 are lifted up to project from the switch slot 9 and the pin holes 11a respectively. Accordingly, the probes S11 and S31 of the type detector switches S1 and S3 move into the recesses 4a of the detecting pattern region 4 of the negative film masking 2 and remain inactivated while the probe S21 of the type detector switch S1 is pressed against the land 4b of the detecting pattern region 4 and turned on.

As the result, a detection signal is produced by the combination action of the three type detector switches S1, S2, and S3 which is determined by the layout of the recesses 4a and land 4b representing the size of the masking window 2A of the negative film masking 2. The detection signal is then fed to the display means 21 which in turn displays the type of the negative film masking 2 thus allowing the operator to judge whether or not the size is a desired one.

(3) Meanwhile, as the support 15 being lifted up, the probe S41 of the direction detector switch S4 is pressed against the land 6b of the direction detecting pattern region 6 and switched on to produce a detection signal which is indicative of correctness of the direction of the negative film masking 2. The display means 21 on receiving the direction detection signal from the switch S4 displays the correctness of the direction.

Figure 7:
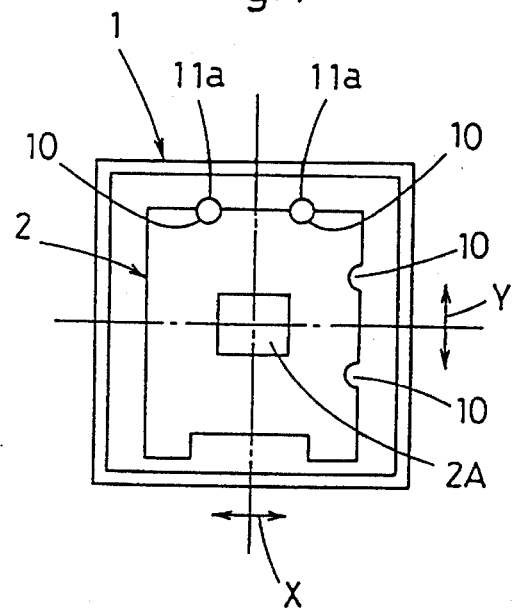
FIG. 7 is a plan view showing the negative film masking placed on the masking base in the first embodiment.

(4) The lifting lever 12B of the lifting means 12 is returned to its original position and the detector switches S1 to S4 and the positioning pins 11 are lowered and retracted from the base surface 1A. Then, the trimming action is conducted (as shown in FIG. 7) by moving the negative film masking 2 in both the X and Y directions with the use of a driving means (not shown) while its image is viewed on the monitor screen (not shown) of the display means 21.

(5) Finally, a trimmed image is aligned at its center with the optical axis for exposure.

Embodiment 2

A negative film masking apparatus comprises a masking base 101 and a negative film masking 102 movably mounted on the masking base 101. For trimming action, the negative film masking 102 is moved in both the X direction (or widthwisely of a negative film F loaded in the negative film masking apparatus) and the Y direction (or at a right angle to the widthwise direction of the negative film F).

There are provided an exposure apparatus (not shown) beneath the negative film masking apparatus and a light source (not shown) above the same. Also, an apparatus for aligning the center of a trimmed image with the optical axis is provided but not illustrated.

Figure 9:
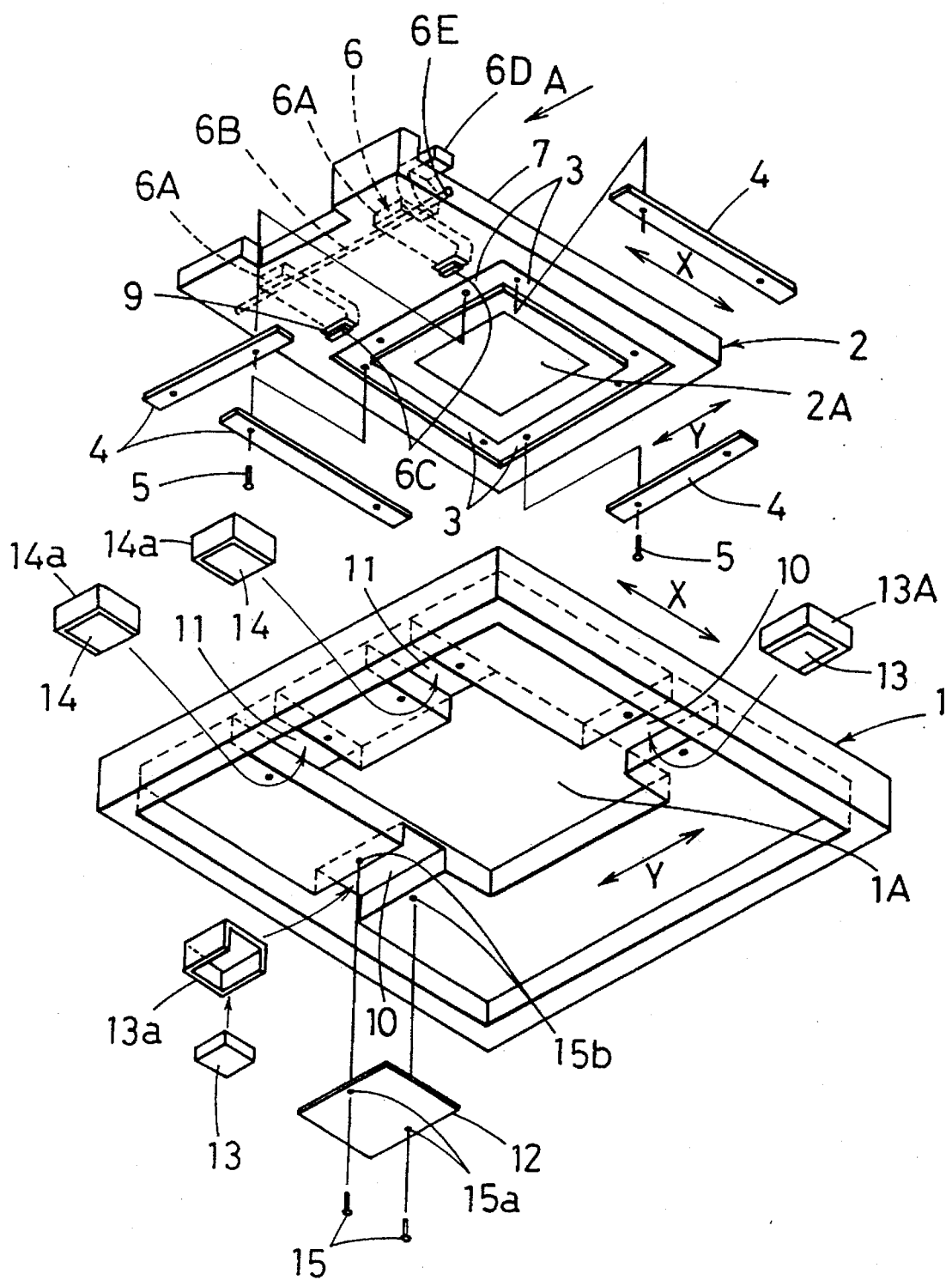
FIG. 9 is an exploded perspective view of a negative film masking apparatus for a photographic printer according to a second embodiment of the present invention.
Figure 10:
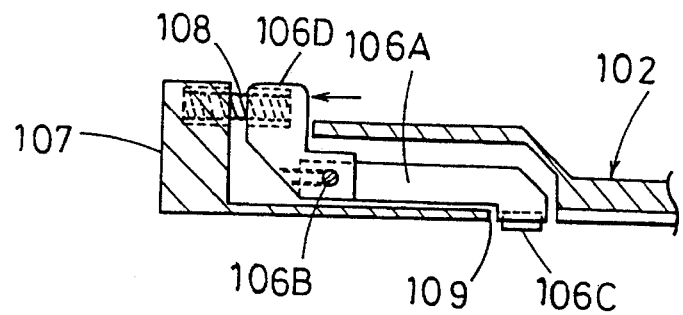
FIG. 10 is a view taken from the direction of an arrow mark A in FIG. 9.
Figure 11:
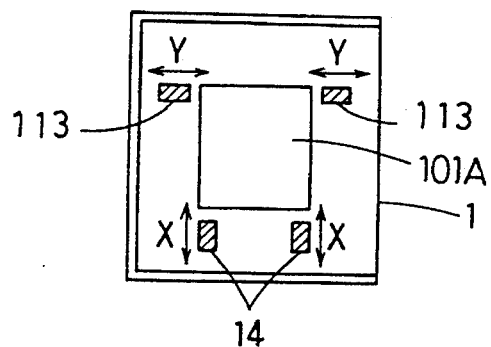
FIG. 11 is a schematic plan view showing the movement of magnets during the trimming action in the second embodiment.
Figure 12:
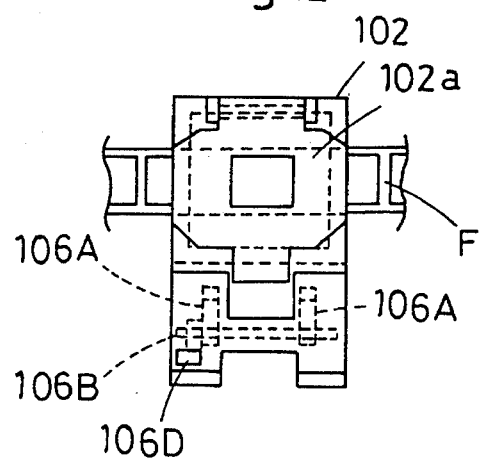
FIG. 12 is a plan view showing the second embodiment.
Figure 13:
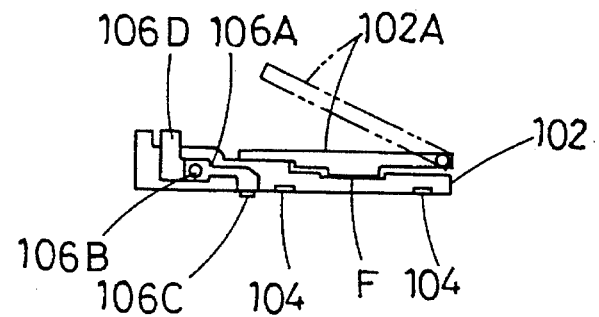
FIG. 13 is a side view showing the second embodiment.
Figure 14:
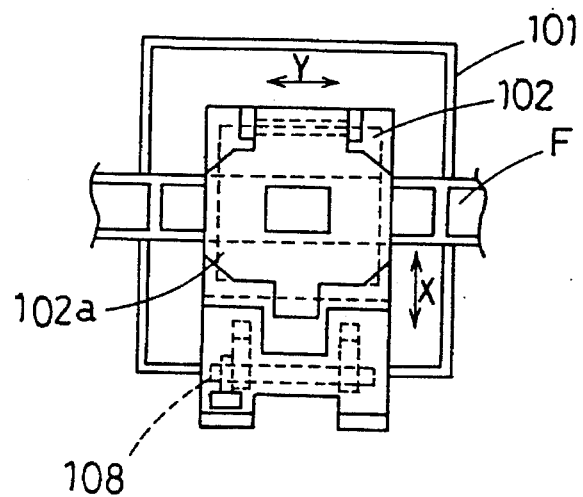
FIG. 14 is a plan view showing the trimming action in the second embodiment.

The negative film masking 102 has at center a masking window 102A therein for use in the trimming action and a fitting groove 103 extending about the masking window 102A. Magnetic plates 104 of a rectangular shape are fitted by retaining means 105 such as screws into the fitting grooves 103 to extend in the X and Y directions (FIG. 9).

The negative film masking 102 is provided with a stopper 106.

The stopper 106 comprises a pair of blocks 106A and a rotary shaft 106B arranged integral with the proximal ends of the blocks 106A. The rotary shaft 106B is supportedly fitted at both ends in two shaft support holes 106E provided in a circumferential wall 107 of the negative film masking 102.

Each the block 106A has at distal end a rubber 106C which is accepted in a window 109 provided in the negative film masking 102.

A release lever 106D is arranged integral with the proximal end of one of the blocks 106A. There is also a compression spring 108 mounted between the release lever 106D and the circumferential wall 107 of the negative film masking 102 to urge by its yielding force the distal ends of the two blocks 106A to projection downwardly through their respective windows 109.

When the release lever 106D is pulled as resisting the yielding force of the compression spring 108, the blocks 106A are lifted up and their rubbers 106C retract into the windows through 109.

Accordingly, the upper surface of the masking base 101 is cleared thus allowing the negative film masking 102 to move freely.

A negative film holddown arm 102a is pivotably mounted to the negative film masking 102 for rise and fall movements to hold the negative film F.

The masking base 101 is made of a non-magnetic material and has at center a square opening 101A therein for passing a beam of light for exposure.

There are first 110 and second guide slots 111 provided about the square opening 101A in the back side of the masking base 101. The first guide slots 110 extend In the Y direction and the second guide slots 111 extend in the X direction. The first 110 and second guide slots 111 are closed from below with covers 112 respectively.

As shown in FIG. 9, each of the covers 112 for closing the guide slots 110 and 111 is secured with two retainers or screws 115 which extend through apertures 115a in the cover 112 to holes 115b in the negative film masking 2.

The guide slots 110 and 111 are open at the square opening 101A side where stoppers (not shown) are disposed for preventing magnets 113 and 114, which will be described later in more details, from moving out from the guide slots 110 and 111.

Each the first magnet 113 is fitted in a holder 113a for sliding movement along the first guide slot 110 in the Y direction.

Similarly, the second magnet 114 is fitted in a holder 114a for sliding movement along the second guide slot 111 in the X direction.

The negative film masking apparatus for a photographic printer according to the second embodiment preforms a sequence of steps as explained below for improved trimming action.

(1) At beginning, the negative film masking 102 is placed over the masking base 101 with the magnetic plates 104 attracted by the magnets 113 and 114 of the masking base 101.

Simultaneously, the rubbers 106C of the blocks 106A in the negative film masking 102 are urged against the upper surface of the masking base 101 by the yielding force of the compression spring 108 thus engaging the masking 102 with the masking base 101 under friction.

(2) When the release lever 106D is pulled, the rubbers 106C of the stopper 106 retract into their respective windows 109 to disengage the negative film masking 102 from the masking base 101. Then, the negative film masking 102 becomes movable in both the X and Y directions for conducting a trimming action.

(3) For movement in the Y direction, the negative film masking 102 can be slid on the upper surface of the masking base 101 while its magnetic plates 104 being attracted by the first magnets 113.

Upon reaching the ends of the first guide slots 110, the first magnets 113 is halted and allow no further movement. Then, if the negative film masking 102 is further moved, it has to resist the magnetic force of the first magnets 113 but the second magnets 114 remain stationary and does not move in the X direction.

(4) Pot movement in the X direction, the negative film masking 102 can be slid on the upper surface of the masking base 101 while its magnetic plates 104 being attracted by the second magnets 114.

Upon reaching the ends of the first guide slots 111, the second magnets 114 is halted and allow no further movement. Then, if the negative film masking 102 is further moved, it has to resist the magnetic force of the second magnets 114 but the first magnets 113 remain stationary and does not move in the Y direction.

Figure 15:
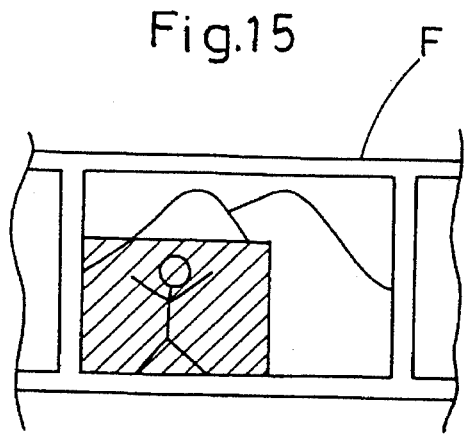
FIG. 15 is a plan view of a trimmed image in the frame.

(5) After a trimmed image area (the shaded area in FIG. 15) is determined, the release lever 106D of the stopper 106 is unlocked to allow the fractional engagement of the negative film masking 102 with the masking base 101 where the rubbers 106C of the blocks 106A of the stopper 106 are actuated.

(6) Finally, the trimmed image is aligned at its center with the optical axis for exposure.

It is understood that the arrangement of the magnets 113 and 114 in the negative film masking 102 is not limited to the second embodiment but various modifications and changes on e.g. the number and/or location of the magnetic plates 104 or guide slots 110 and 111 or magnets 113 and 114 will be possible, as long as the magnets 113 and 114 are arranged movable in the same directions as of the negative film masking 102.

What is claimed is:

1. A negative film masking apparatus for use in a photographic printer, said apparatus comprising:

a mask base having an upper surface having formed therein pin holes and a switch slot;

positioning pins mounted in said pin holes for movement therein between a projected position, whereat said pins project upwardly from said upper surface, to a retracted position, whereat said pins do not project from said upper surface;

detector switches mounted in said switch slot for movement therein between a projected position, whereat said switches project upwardly from said upper surface, to a retracted position, whereat said switches do not project from said upper surface;

a plurality of negative film masks, each said mask having therein a masking window of a discrete size corresponding to a respective size of a negative film to be printed, and each said mask having a lower side having detecting pattern regions in the form of recesses and a land of an arrangement representative of said size of said masking window;

each said mask being positionable on said mask base with said lower side of said mask being mounted on said upper surface of mask base; and lifting means for moving said pins and said switches from said respective retracted positions thereof to said respective projected positions thereof, such that said pins locate said each mask at a given position with respect to said mask base, and such that each said switch is pressed against said land or is received in a respective said recess, thereby resulting in a combination of on/off switching conditions of said switches indicative of said size of said masking window and generating a detection signal representative thereof.

2. An apparatus as claimed in claim 1, further comprising a display operatively connected to said switches to receive and display said signal.

3. An apparatus as claimed in claim 1, wherein said lifting means is operable to move said pins and said switches from said respective projecting positions thereof to said respective retracted positions thereof, after which said mask is movable along said upper surface of said mask base to perform a negative trimming operation.

4. An apparatus as claimed in claim 1, wherein each said mask has means to receive said pins when said pins are moved to said projected position thereof by said lifting means, thereby to locate said each mask in said given position with respect to said mask base.

5. An apparatus as claimed in claim 4, wherein said means to receive comprise notches formed in a side edge of said each mask.

6. An apparatus as claimed in claim 5, wherein each said mask is rectangular and has adjacent side edges having formed therein respective said notches.

7. An apparatus as claimed in claim 1, wherein each said mask is rectangular and has in adjacent edges of said lower side thereof respective said detecting pattern regions.

8. An apparatus as claimed in claim 1, wherein each said mask has in said lower side thereof a direction pattern region, and further comprising a direction detector switch mounted in said switch slot for movement therein between a projected position, whereat said direction detector switch projects upwardly from said upper surface, to a retracted position, whereat said direction detector switch does not project upwardly from said upper surface, said moving means being operable, when moving said pins and said detector switches from said respective retracted positions thereof to said respective projected positions thereof, to also move said direction detector switch from said retracted position thereof to said projected position thereof and, if said mask is oriented in a correct alignment with respect to said mask base, into contact with said direction pattern region, thereby resulting in generation by said direction detector switch of a signal representative of said correct alignment.

9. A negative film masking apparatus for use in a photographic printer, said apparatus comprising:

a negative mask having a masking window, a lower surface and magnetic plates about said masking window;

a mask base having a square opening, an upper surface and at least first and second guide regions formed of non-magnetic material and extending in respective first and second directions perpendicular to each other;

said mask being positioned on said mask base with said lower surface directed toward said upper surface, said mask being movable relative to said mask base to perform a negative trimming operation; and at least first and second magnets mounted for movement along said first and second guide regions, respectively, in said first and second directions, respectively, said first and second magnets attracting said magnetic plates.

10. An apparatus as claimed in claim 9, wherein said magnetic plates are mounted on said lower surface of said mask.

11. An apparatus as claimed in claim 9, wherein said first and second guide regions comprise first and second guide slots, respectively, that extend rectilinearly in said first and second directions, respectively.

12. An apparatus as claimed in claim 11, wherein said guide slots are formed in a lower surface of said mask base.

13. An apparatus as claimed in claim 11, wherein said non-magnetic material comprises material of said mask base.

14. An apparatus as claimed in claim 11, wherein said magnets are slidable along said first and second slots, respectively.

15. An apparatus as claimed in claim 11, wherein said first and second magnets are mounted in first and second holders, respectively, that are slibably positioned in said first and second slots, respectively.

16. An apparatus as claimed in claim 9, further comprising an anti-slip mechanism operable between said mask and said mask base to prevent unintentional displacement of said mask relative to said mask base.

17. An apparatus as claimed in claim 16, wherein said anti-slip mechanism comprises at least one friction member mounted on said mask and biased in a direction into friction contact with said mask base.

* * * * *